(12) United States Patent
Murasawa et al.

(10) Patent No.: US 11,890,885 B2
(45) Date of Patent: Feb. 6, 2024

(54) PRINTING APPARATUS AND PRINTING METHOD

(71) Applicant: CANON KABUSHIKI KAISHA, Tokyo (JP)

(72) Inventors: Kouta Murasawa, Kanagawa (JP); Okinori Tsuchiya, Kanagawa (JP); Hiromitsu Yamaguchi, Kanagawa (JP); Hideki Kubo, Kanawaga (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 191 days.

(21) Appl. No.: 17/592,808

(22) Filed: Feb. 4, 2022

(65) Prior Publication Data

US 2022/0250401 A1 Aug. 11, 2022

(30) Foreign Application Priority Data

Feb. 9, 2021 (JP) .................................. 2021-019237

(51) Int. Cl.
G06K 15/10 (2006.01)
B41M 3/06 (2006.01)
B41J 2/21 (2006.01)

(52) U.S. Cl.
CPC .............. *B41M 3/06* (2013.01); *B41J 2/2107* (2013.01); *G06K 15/102* (2013.01); *G06K 15/107* (2013.01)

(58) Field of Classification Search
CPC ........................... G06K 15/105; G06K 15/107
See application file for complete search history.

(56) References Cited

U.S. PATENT DOCUMENTS

| 9,981,485 B2 | 5/2018 | Ikeda et al. |
| 2017/0050449 A1 | 2/2017 | Ikeda et al. |
| 2022/0250395 A1 | 8/2022 | Tsuchiya et al. |

FOREIGN PATENT DOCUMENTS

| JP | 2015-214133 A | 12/2015 |
| WO | 2018/139272 A1 | 8/2018 |

*Primary Examiner* — Julian D Huffman
(74) *Attorney, Agent, or Firm* — VENABLE LLP

(57) ABSTRACT

A printing apparatus comprises a decision unit configured to decide a ratio of ink application amounts of the fluorescent ink and the other ink respectively in each of the plurality of scans. The decision unit decides the ratio of the ink application amount of the fluorescent ink in each of the plurality of scans so that the amount of the coloring material of the fluorescent ink in a surface of an ink layer of the printing medium is less than the amount of the coloring material of the fluorescent ink in an inside of the ink layer of the printing medium.

22 Claims, 12 Drawing Sheets

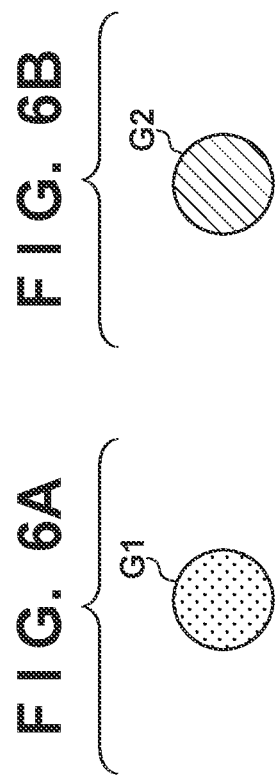 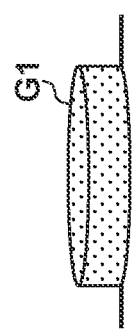 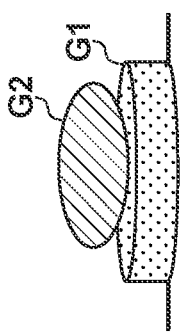 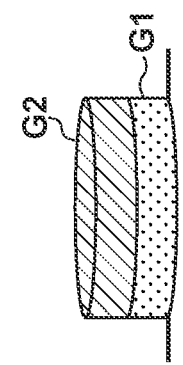 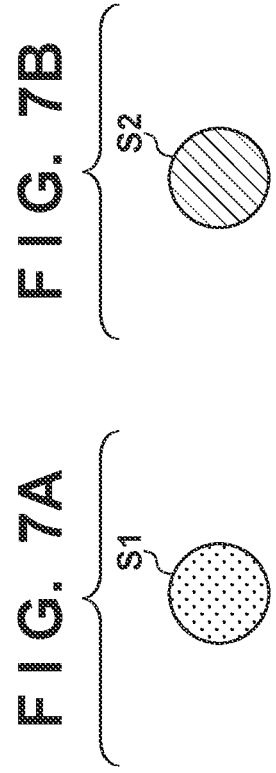 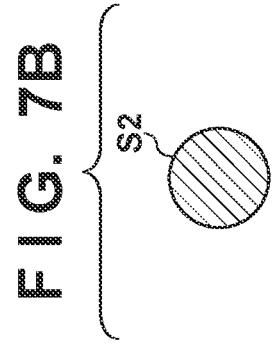 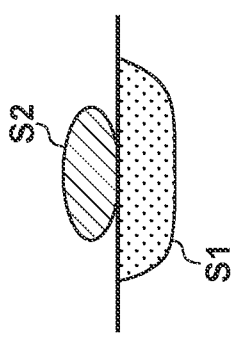 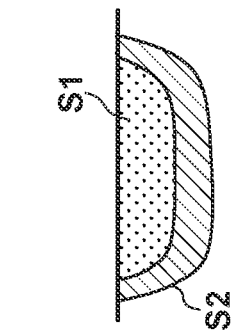

PRINTING APPARATUS AND PRINTING METHOD

BACKGROUND OF THE INVENTION

Field of the Invention

The present invention relates to a printing apparatus and a printing method for printing an image by applying ink droplets from a printing unit onto a printing medium.

Description of the Related Art

Printing apparatuses that control gloss using clear inks are known. In Japanese Patent Laid-Open No. 2015-214133, a matte overcoating is performed on a glossy printing medium by using a UV curable clear ink to impart a matte effect. By putting emphasis on characters or the like, or by embedding a pattern different to the colors by imparting a matte effect to glossy paper at the time of poster printing for example, it is possible to print a poster that is made more eye-catching to a user.

Meanwhile, an ink (fluorescent ink) using a fluorescent coloring material may be used for printing a display piece such as a poster and the like. For example, a printing apparatus capable of vividly developing color by controlling the landing order of a fluorescent ink is known (International Publication No. 2018/139272).

SUMMARY OF THE INVENTION

It is not mentioned in either of these documents that glossiness is controlled using a fluorescent ink.

The present invention provides a printing apparatus and a printing method capable of controlling glossiness using a fluorescent ink.

The present invention in one aspect provides a printing apparatus, a printing apparatus comprising: a printing unit configured to print an image by having a nozzle array set in a conveyance direction of a printing medium and reciprocating in a scanning direction that intersects the conveyance direction of the printing medium to apply ink droplets onto the printing medium from nozzles, wherein the printing unit has a nozzle array corresponding to a fluorescent ink and a nozzle array corresponding to another ink different to the fluorescent ink; a print control unit configured to control a movement of the printing unit and conveyance of the printing medium so as to print an image by a plurality of scans of the printing unit; and a decision unit configured to decide ink application amount ratios of the fluorescent ink and the other ink respectively in each of the plurality of scans, wherein the print control unit, based on the ink application amount ratios decided by the decision unit, performs control of the movement of the printing unit and the conveyance of the printing medium, and the decision unit decides the ink application amount ratio of the fluorescent ink in each of the plurality of scans so that the amount of the coloring material of the fluorescent ink in a surface of an ink layer of the printing medium is less than the amount of the coloring material of the fluorescent ink in an inside of the ink layer.

By virtue of the present invention, it is possible to control glossiness using a fluorescent ink.

Further features of the present invention will become apparent from the following description of exemplary embodiments with reference to the attached drawings.

BRIEF DESCRIPTION OF THE DRAWINGS

FIGS. 6A to 6D are diagrams for explaining an image forming process in an ink deposition model.

FIGS. 7A to 7D are diagrams for explaining an image forming process in an ink permeation model.

DESCRIPTION OF THE EMBODIMENTS

Figure 1:
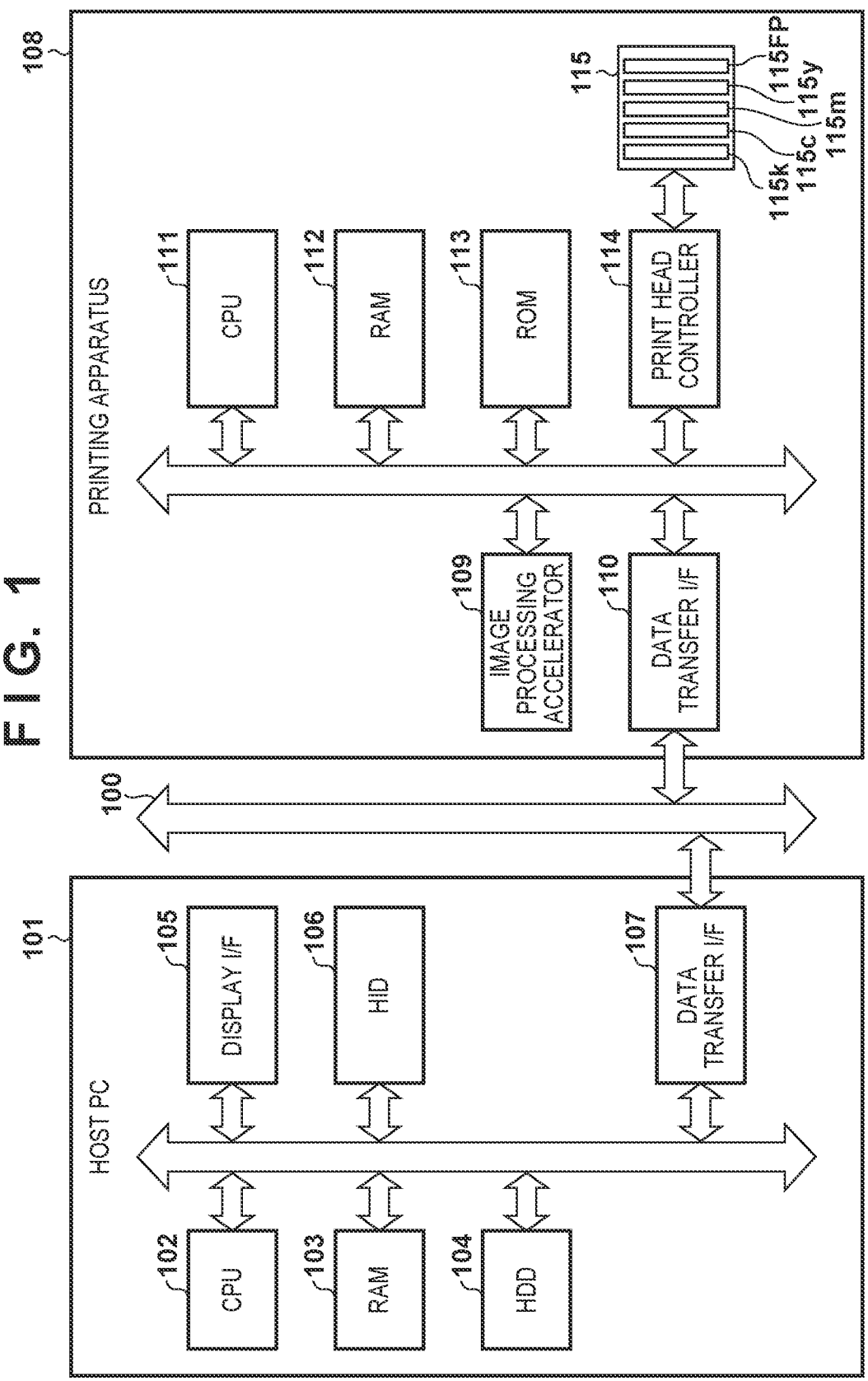
FIG. 1 is a block diagram illustrating a configuration of a printing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The terms used in this specification are defined in advance as follows. In this specification, the term "print" may be used not only in cases of forming meaningful information such as text and figures, and it doesn't matter whether what is formed is meaningful or meaningless or has been manifested to be visually perceivable by a human. "Print" also broadly includes cases where an image, pattern, or the like is formed on a printing medium or the processing of a medium is performed.

"Printing medium" broadly includes not only paper used in general printing devices but also things that can receive ink, such as cloth, plastic film, metal plates, glass, ceramics, wood, and leather.

Ink should be construed broadly in the same manner as the definition of "printing" above. Ink" is meant to represent liquids that by being applied to a printing medium can be supplied in the forming of images, designs, patterns or the like, processing of printing mediums, or processing of ink.

Here, ink processing refers to coagulation or insolubilization of a colorant in an ink applied to a printing medium, for example.

Furthermore, a "nozzle" generally means an orifice or a liquid channel communicating with it, and an element for generating energy used to discharge ink, unless otherwise specified.

In order to perform printing on a printing medium, a print head scans over the printing medium. Here, head movement during acceleration or deceleration of the head for printing or in relation to printing is referred to as "scanning".

A "color reproduction area" is also referred to as a color reproduction range, a color gamut, and a gamut. In general, color reproduction area refers to a range of reproducible colors in any color space. As an index representing the width of the color reproduction area, there is a color gamut volume. A color gamut volume is a three-dimensional volume in any color space. The chromaticity points constituting the color reproduction area may be discrete. For example, a specific color reproduction area may be represented by 729 points on CIE-L*a*b*, and points between the points may be determined using known interpolation operations such as tetrahedral interpolation or cubic interpolation. In such cases, in accordance with the interpolation calculation methods, calculating and accumulating a volume on CIE-L*a*b* of a tetrahedron, a cube, or the like constituting the color reproduction area can be used as a corresponding color gamut volume.

Although the color reproduction area and the color gamut in the present specification are not limited to a particular color space, the color reproduction area in CIE-L*a*b* space is exemplified in the present specification. Likewise, the numerical values of the color reproduction area in this specification indicate the volume when cumulatively calculated in CIE-L*a*b* space on the assumption of tetrahedral interpolation.

<Overall Printing System>

FIG. 1 is a block diagram illustrating a configuration of a printing system in the present embodiment. A host PC or a tablet PC is used as a PC 101. A CPU 102 executes various processes by reading a program stored in an HDD 104 into a RAM 103 as a work area and executing the program. For example, the CPU 102 generates print data printable by a printing apparatus 108 and transfers the print data to the printing apparatus 108 in accordance with commands received from the user via an HID (Human Interface Device) I/F 106 or a touch panel (not shown) or a program stored in the HDD 104. The CPU 102 performs predetermined processing on the print data received from the printing apparatus 108 via a data transfer I/F 107 according to a program stored in the HDD 104, and displays the result and various information on a display (not shown) via a display I/F 105.

In the printing apparatus 108, a CPU 111 comprehensively controls the printing apparatus 108 by reading into a RAM 112 as a work area a program stored in a ROM 113 and executing the program. An image processing accelerator 109 is hardware capable of performing image processing faster than the CPU 111. The image processing accelerator 109 is activated by the CPU 111 writing parameters and data required for image processing to a predetermined address in the RAM 112. The image processing accelerator 109 performs image processing on the data after reading the above-described parameters and data. However, the image processing accelerator 109 is not an essential element, and the equivalent processing may be performed by the CPU 111.

The above parameters may be stored in the ROM 113, or may be stored in a storage (not shown) such as a flash memory or an HDD.

Here, the image processing performed by the CPU 111 or the image processing accelerator 109 is described. The image processing is, for example, processing for generating data indicating dot formation positions of the ink in each scan by a print head 115 based on the received print data. The CPU 111 or the image processing accelerator 109 performs color-conversion processing and quantization processing on the received print data.

The color conversion process is a process of color separation into ink densities handled by the printing apparatus 108. For example, the received print data includes image data indicating an image and fluorescence data for performing fluorescence printing. When the image data is data indicating an image in color space coordinates such as sRGB, which is the display color of the monitor, the data indicating the image in the color coordinates (R, G, B) of sRGB are converted into subtractive color mixture ink data (CMYK) handled by the printing apparatus 108 or ink data (CMYKF) including a fluorescent ink color. Fluorescence data is converted to fluorescent ink data. Furthermore, if there are both data representing images in sRGB color coordinates (R, G, B) and fluorescence data, they are converted to both subtractive color mixture ink data (CMYK) and fluorescent ink data. Alternatively, the data is converted into both ink data (CMYKF) including fluorescent ink colors and fluorescent ink data. In that case, the fluorescent ink data will be generated in two planes. The color conversion method is realized by matrix arithmetic processing, processing that uses a three-dimensional LUT (lookup table) or four-dimensional LUT, or the like.

As an example, the printing apparatus 108 of the present embodiment uses black (K), cyan (C), magenta (M), yellow (Y), and fluorescent (F) ink. Therefore, the image data of the RGB signal and the fluorescence data are converted into image data composed of color signals of 8 bits each of K, C, M, Y, and F. The color signal of each color corresponds to the application amount of each ink. Also, although 5 colors of K, C, M, Y, and F are taken as an example as the number of ink colors, other ink colors such as light cyan (Lc), light magenta (Lm), or gray (Gy) ink having a low density may be used for improving image quality. In this case, ink signals corresponding to these are generated. In this embodiment, an ink such as light cyan (Lc) or light magenta (Lm) or gray (Gy) will be described as a subtractive color mixture ink. Furthermore, an achromatic ink such as black (K) or gray (Gy) will also be described as a subtractive color mixture ink.

After the color conversion processing, quantization processing is performed on the ink data. The quantization process is a process of decreasing the number of levels of tone of ink data. In the present embodiment, quantization is performed using a dither matrix in which threshold values for comparing with values of ink data are arranged for each pixel. Through the quantization processing, eventually binary data indicating whether or not to form a dot at each dot formation position is generated.

After the image processing is performed, the binary data is transferred to the print head 115 by a print head controller 114. At the same time, the CPU 111 operates a carriage motor for operating the print head 115 via the print head controller 114, and further performs print control so as to operate a conveyance motor for conveying a printing medium (paper). The print head 115 scans over the printing medium, and at the same time, ink droplets are applied onto the printing medium by the print head 115, thereby forming an image.

In the case of printing by a plurality of scans, predetermined image processing is performed, and then scanning order determination processing is performed. Scanning order determination processing is a process in which an image is thinned out using a mask pattern or the like for data after the quantization process in order to generate data corresponding to each scan. At this time, the image processing accelerator 109 may be used to speed up the processing.

The PC 101 and the printing apparatus 108 are connected via a communication line 100. In the present embodiment, a local area network is described as an example of the communication line 100, but it may be a USB hub, a wireless communication network using a wireless access point, a connection using a Wifi direct communication function, or the like.

Hereinafter, the print head 115 is described as having a total of 5 print nozzle arrays of 4 colored-inks of cyan (C), magenta (M), yellow-(Y), and black (K) and a fluorescent ink of fluorescent pink (FP). The fluorescent ink may be fluorescent red (FR), fluorescent yellow (FY), fluorescent green (FG), or fluorescent blue (FB) in addition to fluorescent pink.

<Regarding Print Heads of the Printing Apparatus>

Figure 2:
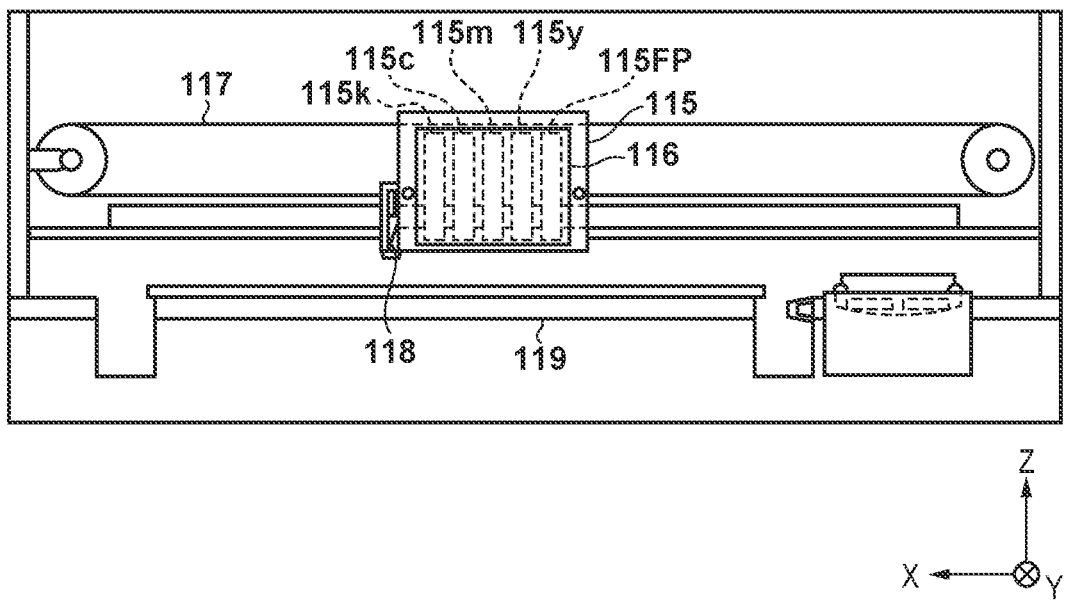
FIG. 2 is a diagram for describing a print head.

FIG. 2 is a diagram for explaining the print head 115 according to the present embodiment. In the present embodiment, an image is printed in a plurality of scans of N times for a unit area of one nozzle array. The print head 115 includes a carriage 116, nozzle arrays 115k, 115c, 115m, 115y, and 115FP, and an optical sensor 118. The carriage 116 on which the five nozzle arrays 115k, 115c, 115m, 115y, and 115FP, and the optical sensor 118 are mounted can reciprocate along the X direction (main scan direction) in the drawing by the driving force of the carriage motor transmitted via a belt 117. The carriage 116 moves in the X direction relative to the printing medium, and ink droplets are ejected from each nozzle of the nozzle array in the gravity direction (the −z direction in the drawing) based on the print data. As a result, an image corresponding to 1/N times of main scanning is printed on the printing medium placed on a platen 119. When the main scanning is completed one time, the printing medium is transported along the conveyance direction intersecting the main scanning direction by a distance corresponding to the width of the main scan 1/N times (in the −y direction in the drawing). By these operations, an image of the width of one nozzle array is printed by a plurality of scans of N times. By alternately repeating such a main scanning and a conveying operation, an image is gradually formed on the printing medium.

Figure 10:
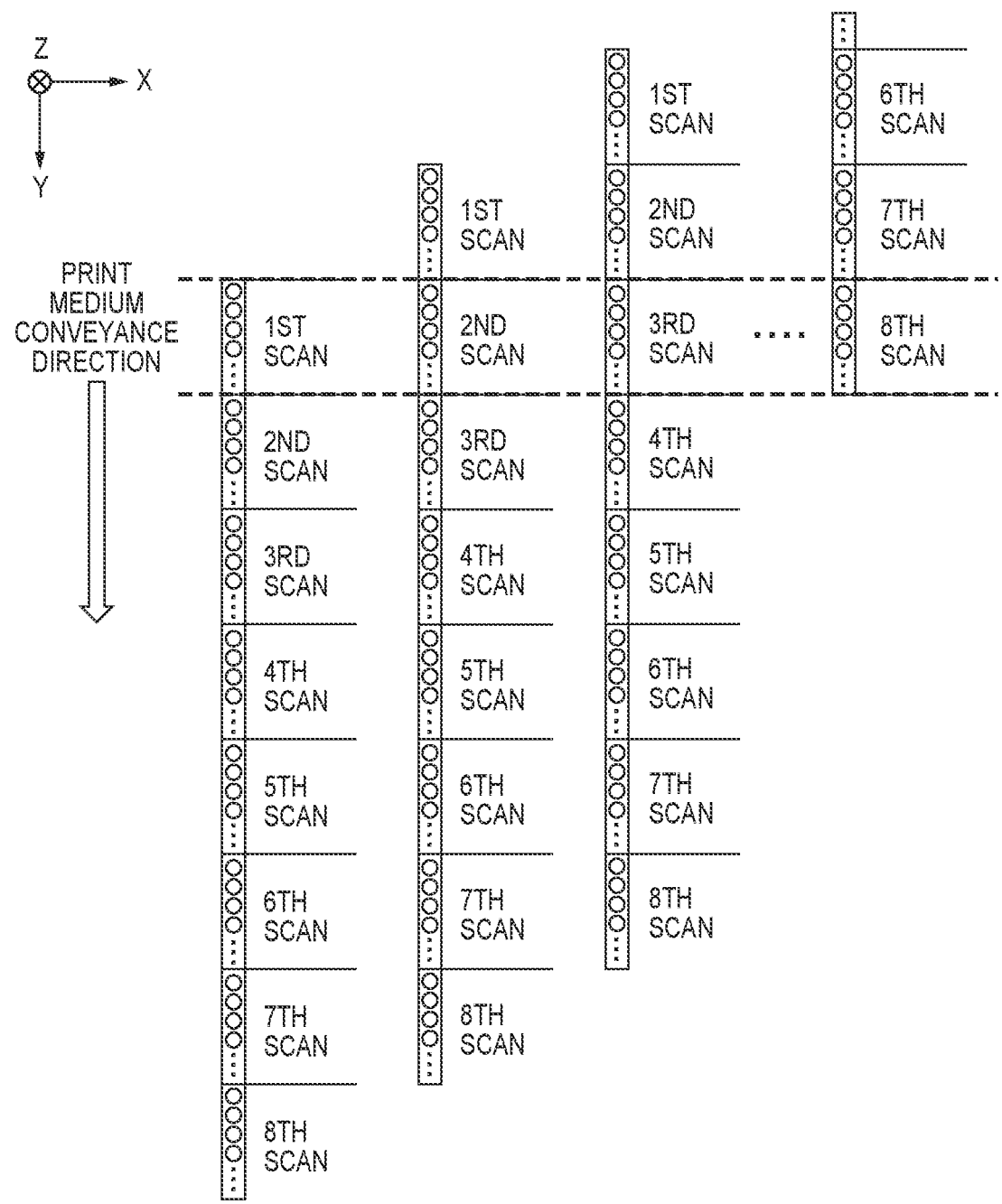
FIG. 10 is a diagram for explaining each scan corresponding to the position of the nozzle.

FIG. 10 is a diagram for explaining each scan corresponding to the position of the nozzle. The area of the first scan from upstream in the conveyance direction (Y direction) of the printing medium and the area of the second scan are continued, and finally, the area of the eighth scan is scanned. The print resolution in the X direction is determined by the discharge frequency and the moving speed of the carriage. The print resolution in the Y direction is determined by the nozzle resolution of the print head 115. In the present embodiment, for example, each of the print resolutions is set to 600 [dpi]. Therefore, the ejected ink dots are printed at a resolution of 600 [dpi] in the vertical and horizontal directions. The optical sensor 118 determines whether the printing medium is present on the platen 119 by performing a detection operation while moving with the carriage 116.

<Description of Print Head>

Figure 3:
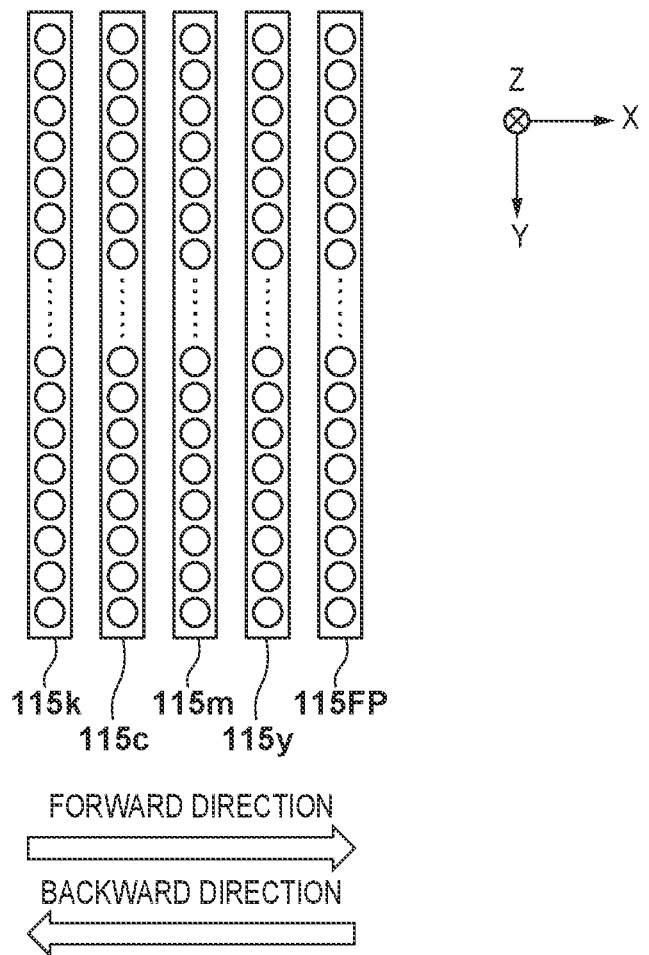
FIG. 3 is a diagram illustrating an arrangement of nozzle arrays.

FIG. 3 is a diagram illustrating the arrangement of the nozzle arrays when the print head 115 is viewed from the upper surface of the printing apparatus 108 (the −z direction). In the print head 115, five nozzle arrays are arranged so as to have different positions in the X direction. That is, the nozzle array 115C corresponding to the ink C, the nozzle array 115M corresponding to the ink M, the nozzle array 115Y corresponding to the ink Y, the nozzle array 115K corresponding to the ink K, and the nozzle array 115FP corresponding to the ink FP are arranged. Ink droplets of C ink are ejected from the nozzles of the nozzle array 115C. Ink droplets of M ink are ejected from the nozzles of the nozzle array 115M. Ink droplets of Y ink are ejected from the nozzles of the nozzle array 115Y. Ink droplets of K ink are ejected from the nozzles of the nozzle array 115K. Ink droplets of FP ink are ejected from the nozzles of the nozzle array 115FP. In each nozzle array, a plurality of nozzles for ejecting ink droplets are arranged at a predetermined pitch along the Y direction.

<Characteristics of Fluorescent Inks and Subtractive Color Mixture Inks>

Figure 4:
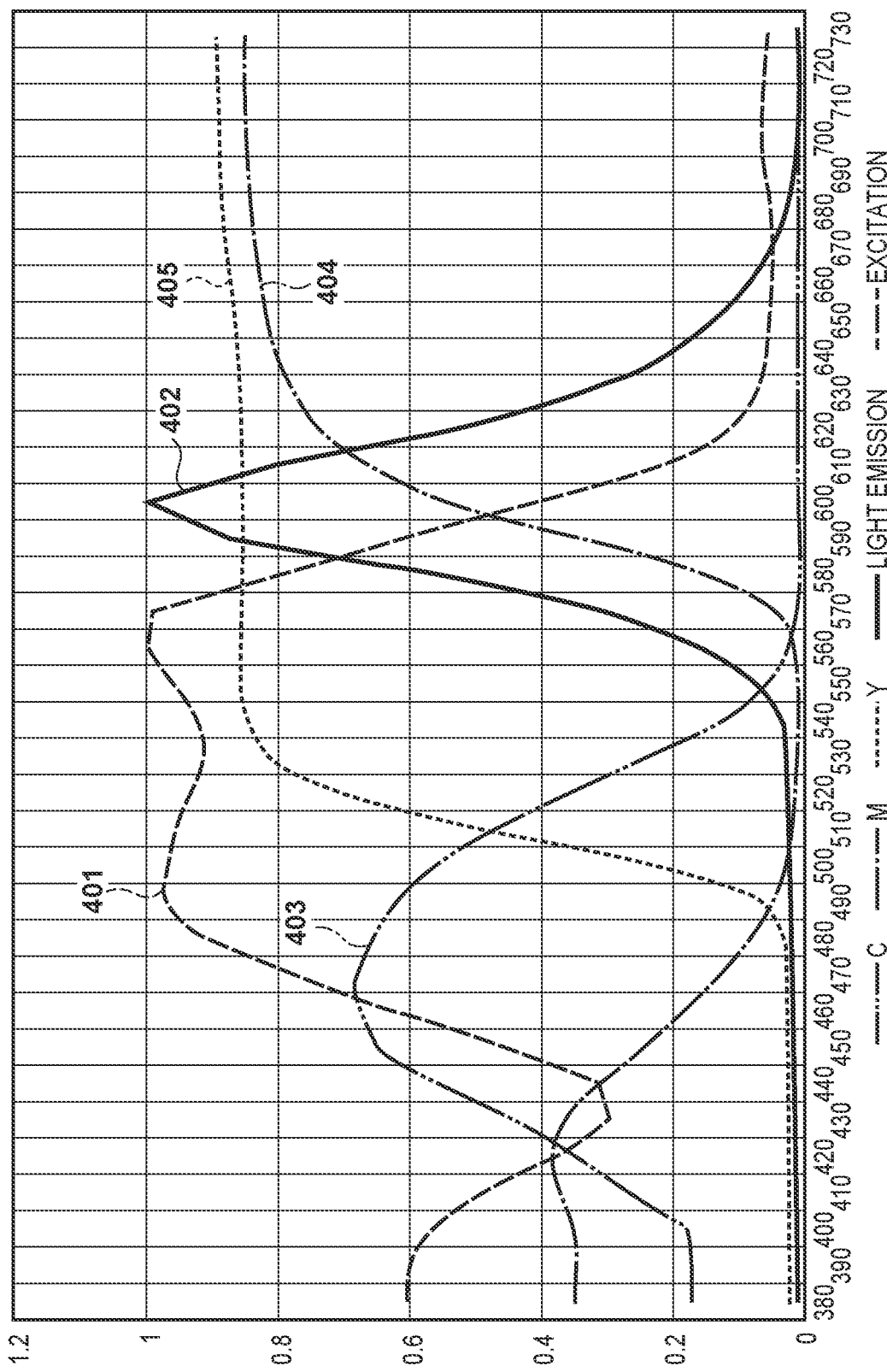
FIG. 4 is a diagram illustrating the intensity of excitation and the intensity of emission when fluorescent pink ink is printed.

The fluorescent coloring material is a coloring material that develops color by absorbing light of an excitation wavelength in a ground state and enters an excited state, and emits light of an emission wavelength and returns to the ground state. FIG. 4 is a graph illustrating the intensity of an excitation wavelength 401 and the intensity of an emission wavelength 402 when the fluorescent pink ink is printed on the printing medium. The horizontal axis of FIG. 4 illustrates the wavelength of light and the vertical axis illustrates the intensity. The graph of FIG. 4 illustrates the intensity of each light when the wavelength of the light incident on a printing sample and the wavelength of the light received from the sample are respectively changed and detected.

The emission wavelength 402 represents, for each wavelength, the intensity of light received from the printing sample when the printing sample is irradiated with light having an excitation wavelength. FIG. 4 illustrates when 480 nm light is irradiated onto a printing sample. The excitation wavelength 401 represents the intensity of the received light when the wavelength of the received light is fixed and the wavelength of the light irradiated onto the printing sample is changed. FIG. 4 illustrates a case where the wavelength of light received is fixed at 600 nm. As illustrated in FIG. 4, the wavelength region in which the fluorescent ink printed on the printing medium is excited overlaps the wavelength region in which light is emitted and is on the short wavelength side. Also, the excitation wavelength 401 is strong or weak for each wavelength and there are wavelengths that efficiently emit light and wavelengths that do not. In addition, since the fluorescent coloring material emits light, the reflectance at the emission wavelength often exceeds 1. In this embodiment, a coloring material having such characteristics as described above is referred to as a fluorescent coloring material.

In the above, excitation and emission of the fluorescent pink ink have been described, but in this embodiment, a fluorescent ink that emits other wavelengths may be used. For example, a fluorescent blue ink that emits light in the blue region (450 nm to 500 nm) may be used, or a fluorescent green ink that emits light in the green region (500 nm to 565 nm) may be used. Furthermore, a fluorescent yellow ink that emits light in the yellow region (565 nm to 590 nm) may be used, or a fluorescent orange ink or a fluorescent red ink that emit light in the red region (590 nm to 780 nm) may be used. Further, a fluorescent ink in which the above are combined may be used. For example, a fluorescent yellow ink or the like which emits light in a region combining a yellow region and a red region may be used. Further, the color tone may be adjusted by combining fluorescent inks having different intensities of excitation wavelengths. For example, a fluorescent pink that emits light in the orange region, in which excitation in the blue region is weak and excitation in the green region is strong, may be used.

In this embodiment, a non-fluorescent ink is referred to as a subtractive color mixture ink. In other words, among the incident light, an ink that absorbs light of a specific wavelength and does not emit light is referred to as a subtractive color mixture ink. For example, a subtractive color mixture ink has a spectral reflectance as illustrated in the cyan ink 403, the magenta ink 404, and the yellow ink 405 in FIG. 4. Note that the graph of FIG. 4 illustrates the results measured using a method of measuring spectral reflectance. Unlike fluorescent inks, subtractive color mixture inks do not have a reflectance greater than 1 because they only absorb light.

Next, color mixing of the fluorescent ink and the subtractive color mixture ink onto the printing medium is described by using FIG. 4. When the fluorescent pink ink and the yellow ink 405 are mixed, the yellow ink absorbs light in a wavelength range of the excitation wavelength 401 of the fluorescent pink ink. Therefore, since the excitation light is absorbed by yellow ink, fluorescent pink ink cannot be sufficiently excited, and light emission is suppressed.

When the fluorescent pink ink and the cyan ink 403 are mixed, the cyan ink absorbs light in a wavelength range of the emission wavelength 402 of the fluorescent pink ink. Therefore, light emitted by the fluorescent pink ink is absorbed by the cyan ink, and light emission is suppressed.

When the fluorescent pink ink and the magenta ink 404 are mixed, the magenta ink absorbs light in a wavelength range of high excitation sensitivity of the fluorescent pink ink. Therefore, the fluorescent pink ink cannot be sufficiently excited, and light emission is suppressed. Therefore, light emitted by the fluorescent pink ink is absorbed by the magenta ink, and light emission is suppressed.

When the fluorescent pink ink and a black ink (not shown) are mixed, the black ink absorbs light in the wavelength range of the excitation wavelength 401 of the fluorescent pink ink and absorbs light in the wavelength range of the emission wavelength 402. Therefore, the fluorescent pink ink cannot be sufficiently excited, and light emission is suppressed.

In other words, when the fluorescent pink ink and the subtractive color mixture ink are mixed, the contribution ratio of the fluorescent pink ink to the color development decreases. This property is also greatly affected by the positional relationship between the fluorescent ink and the subtractive color mixture ink on the printing medium. When the ink layer by the fluorescent ink is on a layer higher than the ink layer by the subtractive color mixture ink, the lower layer is more strongly affected by the subtractive color mixture ink. As a result, the contribution ratio of the fluorescent pink ink to the color development is also smaller in the lower layer than in the case where the fluorescent ink is on the layer higher than the subtractive color mixture ink.

Figure 5:
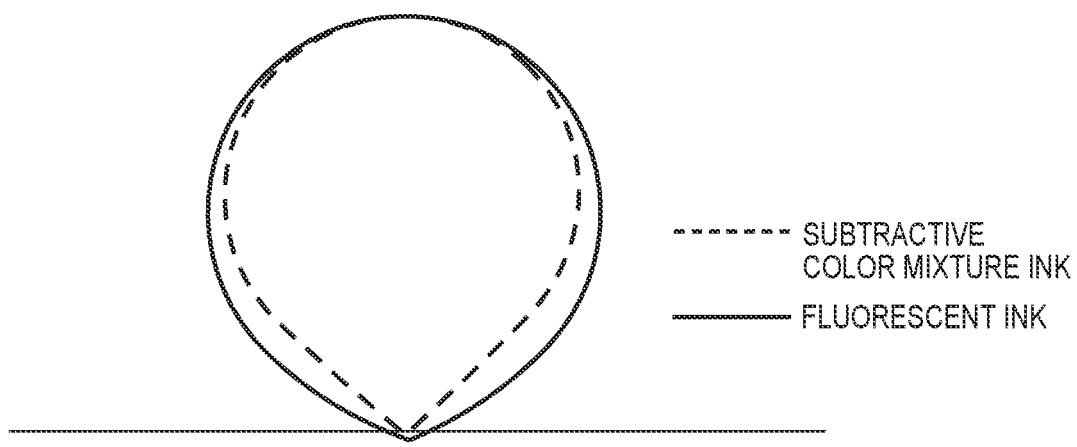
FIG. 5 is a diagram illustrating gonio-spectral reflection properties of the fluorescent ink and subtractive color mixture ink.

The gonio-spectral reflection properties of the fluorescent ink and the subtractive color mixture ink are described with reference to FIG. 5. In FIG. 5, the solid line represents a fluorescent ink, and the broken line represents a subtractive color mixture ink, and the drawing schematically represents a bidirectional reflectance distribution function for the gonio-spectral reflection properties of each ink. As a method of measuring the gonio-spectral reflection properties, for example, a method is used in which a sample printed on a printing medium is irradiated with vertical light and the received reflected light is detected by changing the angle. As illustrated in FIG. 5, it can be seen that the gonio-spectral reflection properties of the fluorescent ink is isotropically scattered as compared with the gonio-spectral reflection properties of the subtractive color mixture ink. This is because the fluorescent ink absorbs light, is excited, and emits light, so that the directionality of incident light is lost, which strongly depends on the directionality of the emission of the fluorescent ink. As described above, the fluorescent ink tends to be stronger in the scattering of light than the subtractive color mixture ink.

<Fluorescent Ink>

Next, the fluorescent ink used in this embodiment is described. This embodiment uses a fluorescent ink created by mixing a dispersing body of a coloring material having fluorescent characteristics with a solvent and an active material. The dispersing body of the fluorescent coloring material used in this embodiment is a dispersing body of the coloring material having the above-described fluorescent characteristics. Examples include the dispersing body of fluorescent coloring material used may be NKW-3207E (fluorescent pink water dispersing body: Japan Fluorescent Chemical) or NKW-3205E (fluorescent yellow water dispersing body: Japan Fluorescent Chemical), but any dispersing body of a coloring material having fluorescent properties may be used.

The fluorescent coloring material dispersing body described above made into ink by combining a known solvent and an activator and dispersing the fluorescent coloring material dispersing body therein. The method of dispersing the fluorescent coloring material dispersing body is not particularly limited. For example, a fluorescent coloring material dispersing body dispersed by a surfactant, a resin-dispersed fluorescent coloring material dispersing body which is dispersed by a dispersion resin, or the like can be used. Of course, it is also possible to combine and use fluorescent coloring material dispersing bodies having a different dispersion methods. As the surfactant, an anionic, non-ionic, cationic, or zwitterionic activator can be used. Any dispersion resin may be used as long as it is a resin having water solubility or water dispersibility, but among them, a dispersion resin having a weight average molecular weight of 1,000 or more and 100,000 or less is preferred, and 3000 or more and 50,000 or less is particularly preferred. As the solvent, for example, an aqueous medium containing water and a water-soluble organic solvent is preferably used.

In the present embodiment, for example, pigment inks of five colors, black (K), cyan (C), magenta (M), yellow (Y), and fluorescent pink (FP), are used.

<Printing Medium>

The printing medium in the present embodiment has a base material and at least one ink receiving layer. In the present embodiment, for example, a printing medium for printing by an ink jet printing method is used. In the present embodiment, for example, glossy paper is used as a printing medium, and pigment ink is used as a coloring material.

<Image Forming Process on Printing Medium: Ink Deposition Model>

The image forming process on a printing medium is described with reference to FIG. 6. FIG. 6 is a diagram for explaining an image forming process in an ink deposition model in which ink that landed on a printing medium is deposited on the printing medium. This corresponds to an image formation process where printing is performed on a glossy paper for which gaps present on the surface of the printing medium are smaller than a particle size of coloring material particles contributing to color development in pigment ink, for example. The ink deposition model is a model of an image formation process in which a particle size of coloring material particles contributing to color development in ink is larger than gaps in a surface of a printing medium, and an image is formed by depositing coloring material particles on the surface of the printing medium to form an ink layer.

Image formation is performed as illustrated in FIGS. 6A to 6D.

As illustrated in FIG. 6A, pigment ink G1 is applied onto the printing medium P. Then, as illustrated in FIG. 6B, the pigment ink G1 lands on the printing medium P and is deposited. Furthermore, the subsequent pigment ink G2 is supplied. Then, as illustrated in FIG. 6C, the pigment ink G2 lands on the pigment ink G1 which has already been deposited. Then, as illustrated in FIG. 6D, the pigment ink G2 is deposited on the pigment ink G1 which has already been deposited, creating a layer. Thus, a subsequent dot remains in an upper layer on the printing medium in the image formation of the ink deposition model. For example, when glossy paper is used as a printing medium and pigment ink is used as a coloring material, image formation by an ink deposition model is performed.

<Image Forming Process on Printing Medium: Ink Permeation Model>

The image forming process on a printing medium is described with reference to FIG. 7. FIG. 7 is a diagram for explaining an image forming process in an ink permeation model in which ink that landed on a printing medium permeates into the printing medium. This applies to an image formation process in a case where the pigment ink is printed on plain paper having gaps larger than that of the coloring material particles, or a case where the dye ink is printed on plain paper or glossy paper having gaps smaller than that of the coloring material particles, for example. The ink permeation model is a model of an image formation process in which a coloring material penetrates the printing medium below the surface of the printing medium to form an ink layer below the surface of the printing medium because the coloring material particle size contributing to color development in the ink is smaller than the gaps on the surface of the printing medium.

Image formation is performed as illustrated in FIGS. 7A to 7D.

As illustrated in FIG. 7A, pigment ink S1 is applied onto the printing medium P. Then, as illustrated in FIG. 7B, the pigment ink S1 lands on the printing medium P and permeates the printing medium. Further, subsequent pigment ink S2 is applied. Then, as illustrated in FIG. 7C, the pigment ink S2 lands on the pigment ink S1 which has already permeated and occupies the gaps in the surface layer of the printing medium. Then, as illustrated in FIG. 7D, since the dye ink S1 that landed previously occupies the gaps in the surface layer of the printing medium, the dye ink S2 bypasses it and penetrates a lower layer of the printing medium. As a result, the upper layer of the printing medium is a dye ink S1 and the lower layer of the printing medium is a dye ink S2. Thus, in the ink permeation model, the relationship between the landing order and the image forming layer order is the reverse of the ink deposition model, and image formation is performed in which the subsequent dots remain in a lower layer of the printing medium.

<Reduced Glossiness Due to Fluorescent Ink>

As described above, the fluorescent ink absorbs the light of the excitation wavelength and emits the light of the emission wavelength, so that the light received from the surface of the printing medium becomes isotropic light. Therefore, the area in which the fluorescent ink is printed scatters light strongly. The result of this is that the degree of gloss in the area in which the fluorescent ink is printed is lower. As the printing medium, glossy paper having gloss may be used. Known techniques may be used as a method of measuring the glossiness, for example, the incident light angle may be calculated from the relationship between the intensity of the specular reflected light at 20 degrees, 60 degrees, and 80 degrees and the intensity of the diffused light and the intensity of the specular reflected light. In the present embodiment, using the specular glossiness at an incident light angle of 20 degrees. The higher the degree of specular glossiness, the higher the degree of glossiness, and the lower the degree of specular glossiness, the lower the degree of glossiness. Incidentally, a specular glossiness for an incident light angle of 20 degrees is 100% when the reflectivity of the reference surface is about 0.05 in a glass surface whose refractive index n=1.567.

Figure 8:
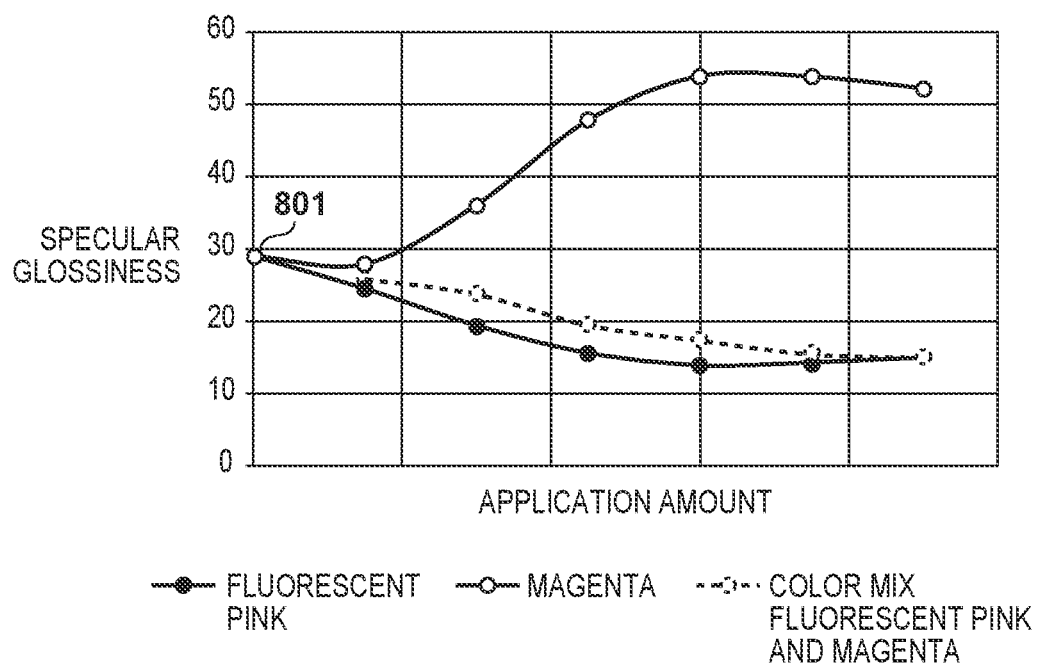
FIG. 8 is a diagram illustrating a measurement result of specular glossiness.

FIG. 8 is a diagram illustrating an example of a measurement result of specular glossiness (20 degrees) when printing is performed on inkjet glossy paper (hereinafter, simply referred to as glossy paper) as a printing medium by changing the application amount of the fluorescent pink ink and the magenta ink respectively. The vertical axis indicates the specular glossiness (20 degrees) and the horizontal axis indicates the application amount. In the horizontal axis, the left end represents the application amount zero, and the application amount increases by equal amounts to the right. In other words, mirror glossiness of the glossy paper is a point 801. The magenta ink in FIG. 8 has a glossiness higher than that of the glossy paper. Therefore, if the amount of magenta ink applied is increased and printing is performed, the glossiness increases. When the ink coverage on the paper surface exceeds 100%, glossiness is almost level. On the other hand, for the fluorescent pink, the glossiness decreases as the application amount increases. When the ink coverage on the paper surface exceeds 100%, the glossiness is almost level.

Thus, the glossiness is reduced by the fluorescent ink. In other words, by printing a mix of magenta ink and fluorescent pink ink, it is possible to reduce the glossiness, as in the dotted line of the graph of FIG. 8. Since the decrease in glossiness is highly correlated with the fluorescent ink application amount as illustrated in FIG. 8, it becomes possible to control the decrease in glossiness by controlling the fluorescent ink application amount. Here, the fluorescent ink application amount for lowering the glossiness is a fluorescent ink application amount such that the specular glossiness decreases more than either the printing medium or the subtractive color mixture ink. In addition, in FIG. 8, an ink having a higher glossiness than that of glossy paper is used, but an ink having a lower glossiness may be used. Even in this case, a fluorescent ink application amount is such that the specular glossiness decreases more than either the printing medium or the subtractive color mixture ink. For example, as the fluorescent ink application amount to reduce the glossiness is determined such that the specular glossiness is less than 20%. Thus, it becomes possible to control a decrease in glossiness using the fluorescent ink.

Figure 9:
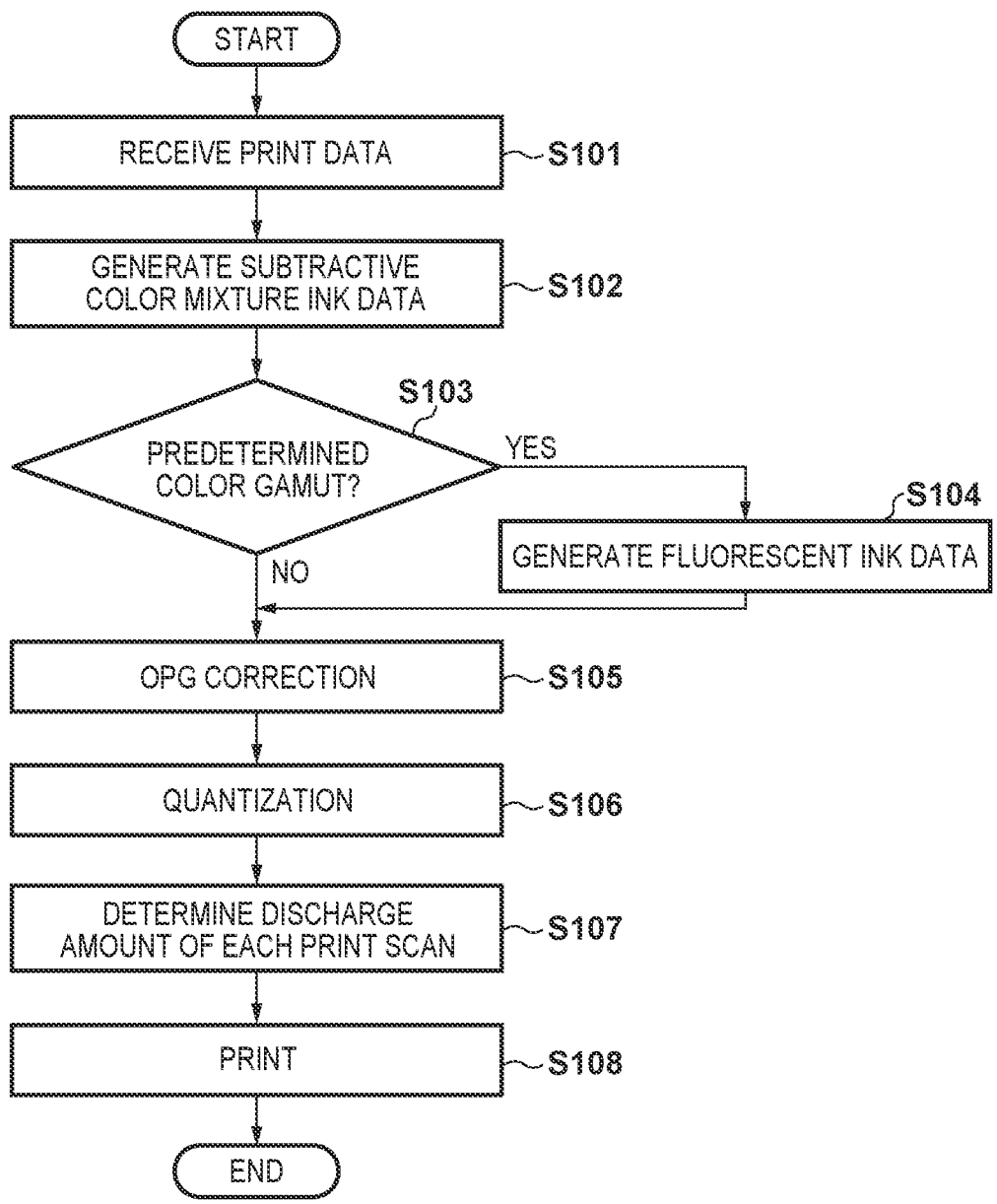
FIG. 9 is a flowchart for describing glossiness control processing.

FIG. 9 is a flowchart for describing glossiness control processing in the present embodiment. In this embodiment, by the processing of FIG. 9, it is possible to control the printing so that the glossiness is lowered by the fluorescent ink in the color gamut determined by the fluorescent ink that is provided. The process of FIG. 9 is realized, for example, by the CPU 111 reading a program stored in the ROM 113 to the RAM 112 and executing the program. The processing of FIG. 9 may be executed by the image processing accelerator 109.

In step S101, the CPU 111 receives the print data transmitted from the PC 101. Print data includes RGB data or CMYK data. In step S102, the CPU 111 generates subtractive color mixture ink data from the print data received in step S101.

In step S103, the CPU 111 determines whether or not the color gamut is a predetermined color gamut for each pixel from the received print data. The predetermined color gamut is described later. If it is determined in step S103 that the color gamut is not the predetermined color gamut, the processing advances to step S105, while if it is determined in step S103 that the color gamut is a predetermined color gamut, the CPU 111, in step S104, generates fluorescent ink data from the print data received in step S101. At this time, fluorescent ink data according to a fluorescent ink application amount for lowering the glossiness level described above, for example, a fluorescent ink application amount by which the specular gloss is less than 20%, is generated. After step S104, the processing advances to step S105. Step S102 to step S104 correspond to the above-described color conversion process and are repeated for each pixel.

In step S105, the CPU 111 performs OutputGamma correction according to dot coverage on the printing medium. In step S106, the CPU 111 performs the quantization processing described above, and in step S107, performs processing for determining the amount of ink coloring material to be applied to the printing medium for each print scan (hereinafter, simply referred to as the "application amount" or the "amount of ink to be applied"). The process of determining the application amount for each print scan is described later. In step S108, the CPU 111 performs printing by controlling the print head 115 on the basis of the application amount for each print scan determined in step S107.

By the above processing, the glossiness can be reduced by the fluorescent ink. Here, when the fluorescent ink is added to the color gamut complementary to the emission wavelength of the fluorescent ink, the color gamut that can be printed by the printing apparatus 108 decreases. Therefore, in the present embodiment, the generation of the fluorescent ink data in step S104 is performed in a predetermined color gamut based on the emission wavelengths of the fluorescent ink.

The predetermined color gamut of step S103 is described. The predetermined color gamut is determined depending on the emission wavelength of the provided fluorescent ink. For example, when the printing apparatus 108 is equipped with a fluorescent blue ink that emits light in the blue region (450 nm to 500 nm), a color gamut of a hue angle of 180 degrees to 360 degrees in the L*A*B color space is determined as a predetermined color gamut.

Also, when the printing apparatus 108 is equipped with a fluorescent green ink that emits light in the green region (500 nm to 565 nm), a color gamut of a hue angle of 90 degrees to 270 degrees in the L*A*B color space is determined as a predetermined color gamut.

For example, when the printing apparatus 108 is equipped with a fluorescent yellow ink that emits light in the yellow region (565 nm to 590 nm), a color gamut of a hue angle of 180 degrees to 360 degrees in the L*A*B color space is determined as a predetermined color gamut.

When the printing apparatus 108 is equipped with a fluorescent orange ink or a fluorescent red ink that emits light in the red region (590 nm to 780 nm), a color gamut of a hue angle of −90 degrees to 90 degrees in the L*A*B color space is defined as a predetermined color gamut.

In this embodiment, one fluorescent ink may be mounted, or a plurality of fluorescent inks may be mounted so as to correspond to the total hue angle. In this embodiment, by determining a predetermined color gamut, it is possible to prevent a decrease in the color gamut due to the addition of fluorescent ink for lowering glossiness.

The process of determining the ratio of the application amounts for each print scan of step S107 is described with reference to FIG. 11. FIG. 11 is a diagram illustrating the ratio of the application amount in each print scan of the fluorescent ink and the subtractive color mixture ink. The ratio of the application amount represents a ratio of the application amount in the respective scans in relation to the application amount represented by the ink data generated in step S102 and step S104. The ratio of the application amounts of each scan sums up to 1, but may be greater than 1 if the application amounts are to be increased. In the present embodiment, for example, an image is printed by eight scans. Hereinafter, a printing medium of an ink permeation model is described as an example. In the printing medium of the ink permeation model, the coloring material of an ink droplet that landed previously is fixed to the upper layer of the printing medium. Then, the coloring material of an ink droplet that landed later is fixed to the lower layer of the coloring material of the ink droplet that landed first.

FIG. 11A to FIG. 11D illustrate the ratio of the application amount when an image is formed using the entire area (full nozzle) of the printing nozzle of the print head 115. As illustrated in FIG. 11A to FIG. 11D, the subtractive color mixture ink is determined to be applied at a constant rate at any scanning time.

Figure 11A:
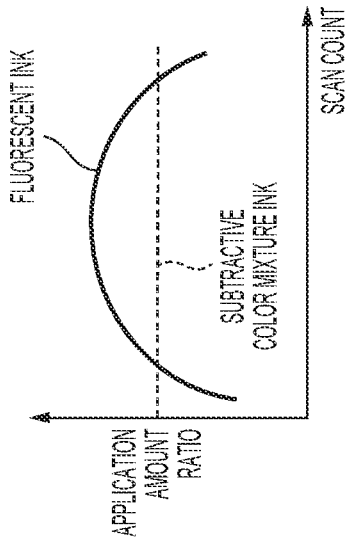
FIGS. 11A to 11F are diagrams illustrating a ratio of an application amount of ink in respective print scans.

As illustrated in FIG. 11A, the ratio of the fluorescent ink application amount is determined so that the ratio of the application amount is lower in a scan close to the start than in subsequent scans. Further, in the scans close to the start, the ratio of the fluorescent ink application amount is determined to be lower than the subtractive color mixture ink. For example, the ratio of the application amount of the fluorescent ink is determined to be lower than the subtractive color mixture ink in the first scan and the second scan. In other words, in the first scan and the second scan, the amount of the coloring material of the fluorescent ink present in the printing medium is determined to be lower than that of the subtractive color mixture ink. With such a configuration, it is possible to reduce glossiness due to the isotropic emission effect of the fluorescent ink while suppressing a color change due to the addition of the fluorescent ink. Further, the ratio of the fluorescent ink application amount is made to be higher than the subtractive color mixture ink from the third scan onwards. That is, the ratio of the amount of the fluorescent coloring material on the surface of the ink layer in the printing medium is reduced compared to the inside of the ink layer. In other words, the closer towards the inside of the ink layer, the more the ratio of the fluorescent coloring material amount increases while the ratio of the amount of the coloring material of the subtractive color mixture ink is constant. As a result, the amount of the fluorescent coloring material in the lower layer is larger than the subtractive color mixture ink, and inhibition of the excitation of the fluorescent ink or absorption of the emission tends to occur due to the absorption of light by the subtractive color mixture ink. Accordingly, in a configuration in which the printing nozzle is used at full nozzle, it is possible to reduce glossiness due to the isotropic emission effect of the fluorescent ink and to reduce the contribution ratio of the fluorescent ink on the color development inside the printing medium.

Figure 11B:
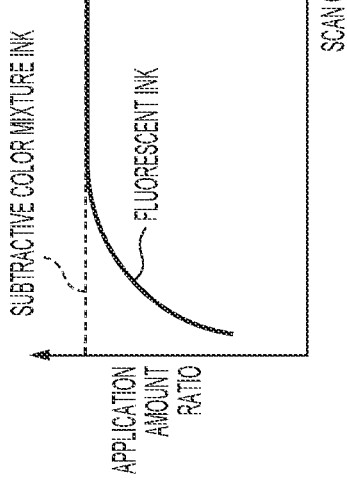

Further, as illustrated in FIG. 11B, it may be determined that the ratio of the fluorescent ink application amount does not exceed the ratio of the subtractive color mixture ink application amount until the final scan. Also, for example, after the third scan, the ratio of the fluorescent ink application amount may be determined to be changeable according to the desired amount of decrease in glossiness between FIG. 11A and FIG. 11B. With such a configuration, it is possible to flexibly control a decrease in glossiness due to the isotropic emission effect of the fluorescent ink.

Figure 11C:
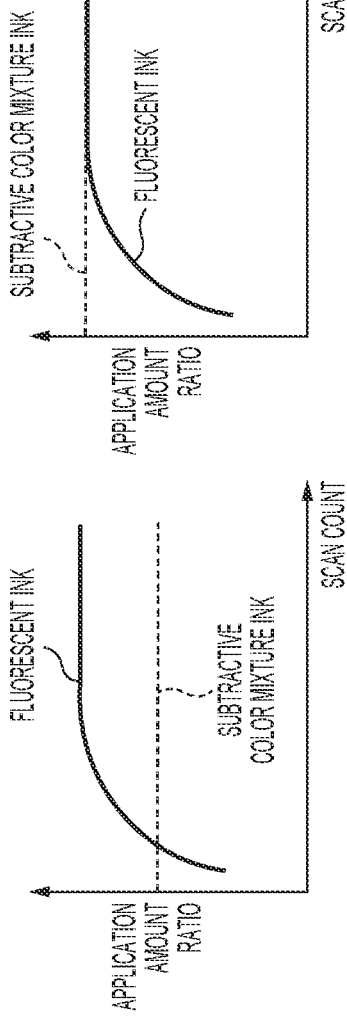

Also, as illustrated in FIG. 11C, the ratio of the application amount of the fluorescent ink may be determined. In other words, the ratio of the fluorescent ink application amount is determined so that the ratio of the amount to be applied is lower than that of the subtractive color mixture ink in the scan close to the start, and gradually increases thereafter, exceeds the ratio of the subtractive color mixture ink application amount, and as the final scan approaches, decreases. At this time, in the final scan, it is determined to not be less than the ratio of the application amount of the first scan. For example, the ratio of the application amount of the fluorescent ink is lower than that of the subtractive color mixture ink in the first scan and the second scan, and gradually increases. From the 3rd scan to the 6th scan, the amount is larger than that of the subtractive color mixture ink, the fourth scan is the peak, and the amount decreases thereafter. In the seventh scan and the eighth scan, the amount gradually decreases and becomes lower than that of the amount of subtractive color mixture ink. That is, the ratio of the amount of the fluorescent coloring material on the uppermost ink layer and the lowermost ink layer in the printing medium is reduced compared to an inner ink layer. Accordingly, in a configuration in which the printing nozzle is used at full nozzle, it is possible to effectively reduce glossiness due to the isotropic emission effect of the fluorescent ink and to reduce the contribution ratio of the fluorescent ink on the color development inside the printing medium.

Figure 11D:
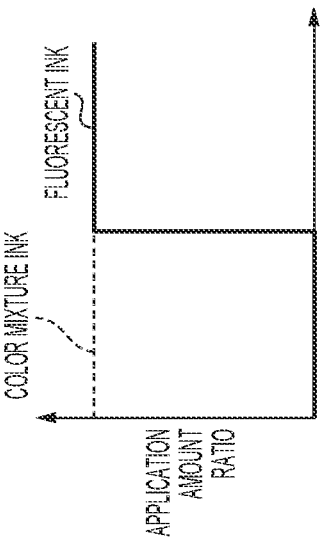

Also, as illustrated in FIG. 11D, it may be determined that the ratio of the fluorescent ink application amount does not exceed the ratio of the subtractive color mixture ink application amount until the final scan. Also, for example, from the third scan to the sixth scan, the ratio of the fluorescent ink application amount may be determined to be changeable according to the desired amount of decrease in glossiness between FIG. 11C and FIG. 11D. With such a configuration, it is possible to flexibly control a decrease in glossiness due to the isotropic emission effect of the fluorescent ink.

In FIG. 11A to FIG. 11D, the ratio of the subtractive color mixture ink application amount is determined to be constant, but configuration may be such that it is not constant if the relationship between the ratio of the fluorescent ink application amount described above is maintained. For example, it may be determined that the ratio of the application amount of the subtractive color mixture ink gradually increases from the first scan, and gradually decreases from the middle scan to the final scan.

Figure 11E:
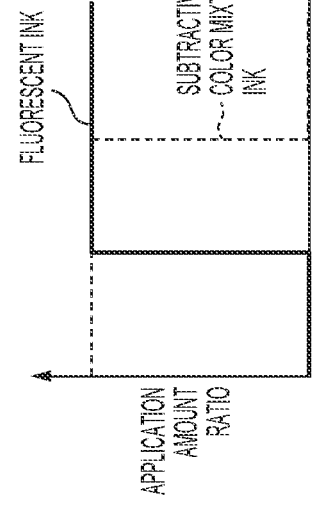
Figure 11F:
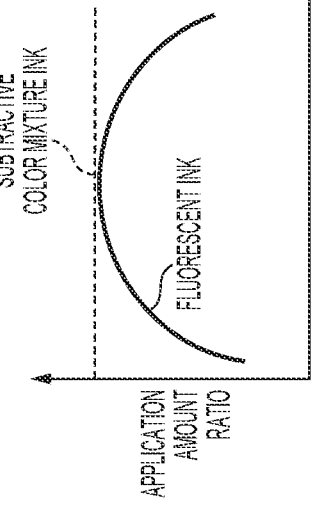

Further, as illustrated in FIG. 11E, it may be determined that the ratio of the application amount of the subtractive color mixture ink is zero in a scan close to the final, and the ratio of the application amount of the fluorescent ink is zero in a scan close to the start. For example, the ratio of the application amount of the subtractive color mixture ink may be determined to be zero in the seventh scan and the eighth scan, and the ratio of the application amount of the fluorescent ink may be determined to be zero in the first scan and the second scan. Also, as illustrated in FIG. 11F, the ratio of the fluorescent ink application amount and the ratio of the subtractive color mixture ink application amount may be switched. Note that, in FIG. 11E and FIG. 11F, the ratio of the fluorescent ink application amount may be determined so as not to exceed the ratio of the subtractive color mixture ink application amount, or may be determined so that the ratio of the fluorescent ink application amount is larger than the ratio of the subtractive color mixture ink application amount, or may be determined so as to be changeable therebetween. With such a configuration, the ratio of the fluorescent coloring material in the upper layer of the ink layer of the printing medium can be further reduced, though a part of the nozzle array of the print head 115 is limited. As a result, it is possible to further suppress color change due to the addition of fluorescent ink. The data (for example, mask data or the like) for determining the ratio of the ink application amounts illustrated in FIG. 11A to FIG. 11F may be stored in the ROM 113 or the like of the printing apparatus 108, or may be obtained from the HDD 104 or the like of the PC 101.

In the present embodiment, a printing medium of a type in which ink penetrates is described, but a printing medium of an ink deposition model may be used. Then, the coloring material of an ink droplet that landed first is fixed in a lower layer than the coloring material of the ink droplet that landed later. Therefore, control that is the opposite of the control of the ratio of the application amount described above is performed. An example of the control of the ratio of a fluorescent ink application amount in the case of the ink deposition model is described below.

The ratio of the fluorescent ink application amount is determined so that the ratio of the application amount of a scan close to the end is lower than that of previous scans. Further, in the scans close to the end, the ratio of the fluorescent ink application amount is determined to be lower than that of the subtractive color mixture ink. For example, the ratio of the application amount of the fluorescent ink is determined to be lower than that of the subtractive color mixture ink in the seventh scan and the eighth scan. With such a configuration, it is possible to reduce the glossiness due to the isotropic emission effect of the fluorescent ink while suppressing a color change due to the addition of the fluorescent ink. Further, the ratio of the fluorescent ink application amount is made to be higher than the subtractive color mixture ink by the sixth scan. That is, the change in the ratio of the application amount of the fluorescent ink in FIG. 11A is inverted to the left and right. Even in that case, as in the case of the printing medium of the ink permeation model, the ratio of the application amount is controlled so that the ratio of the fluorescent coloring material becomes higher in a layer lower than the upper ink layer, so that the same effect can be obtained. In addition, if a change obtained by horizontally inverting the graph of the change in the ratio of the fluorescent ink application amount in FIG. 11B to FIG. 11F is applied to the printing medium of the ink deposition model, the same effect as that in FIG. 11B to FIG. 11F can be obtained.

As described above, in this embodiment, by adding the fluorescent ink, it is possible to realize a decrease in glossiness due to the fluorescent ink. Further, by lowering the ratio of the amount of the fluorescent coloring material in the uppermost ink layer of the printing medium to less than the ratio of the amount of the coloring material of the subtractive color mixture ink, it is possible to suppress color change due to the addition of fluorescent ink. Further, the ratio of the fluorescent ink application amount for each scan is determined so that the ratio of the fluorescent coloring material increases toward the inside of the printing medium. With such a configuration, even in a configuration in which a nozzle array corresponding to the fluorescent ink is used at full nozzle, the above-described effect can be obtained. In a case of overcoating clear ink for gloss control, a part of the nozzle array is limited, and it is difficult to achieve both an increase in printing speed and an impartation of a matte effect. However, according to the present embodiment, even in a configuration in which the nozzle array corresponding to the fluorescent ink is used as the full nozzle, the above-mentioned effect can be obtained, and therefore, it is possible to achieve both an increase in the printing speed and an impartation of a matte effect using the fluorescent ink.

Second Embodiment

Hereinafter, a second embodiment is described with reference to points that are different from the first embodiment. In the first embodiment, control for generating additional fluorescent ink data when it is determined that it is a predetermined color gamut has been described. In the present embodiment, after the predetermined color gamut determination processing, the processing for generating only subtractive color mixture ink data and the processing for generating both subtractive color mixture ink data and fluorescent ink data are switched.

Figure 12:
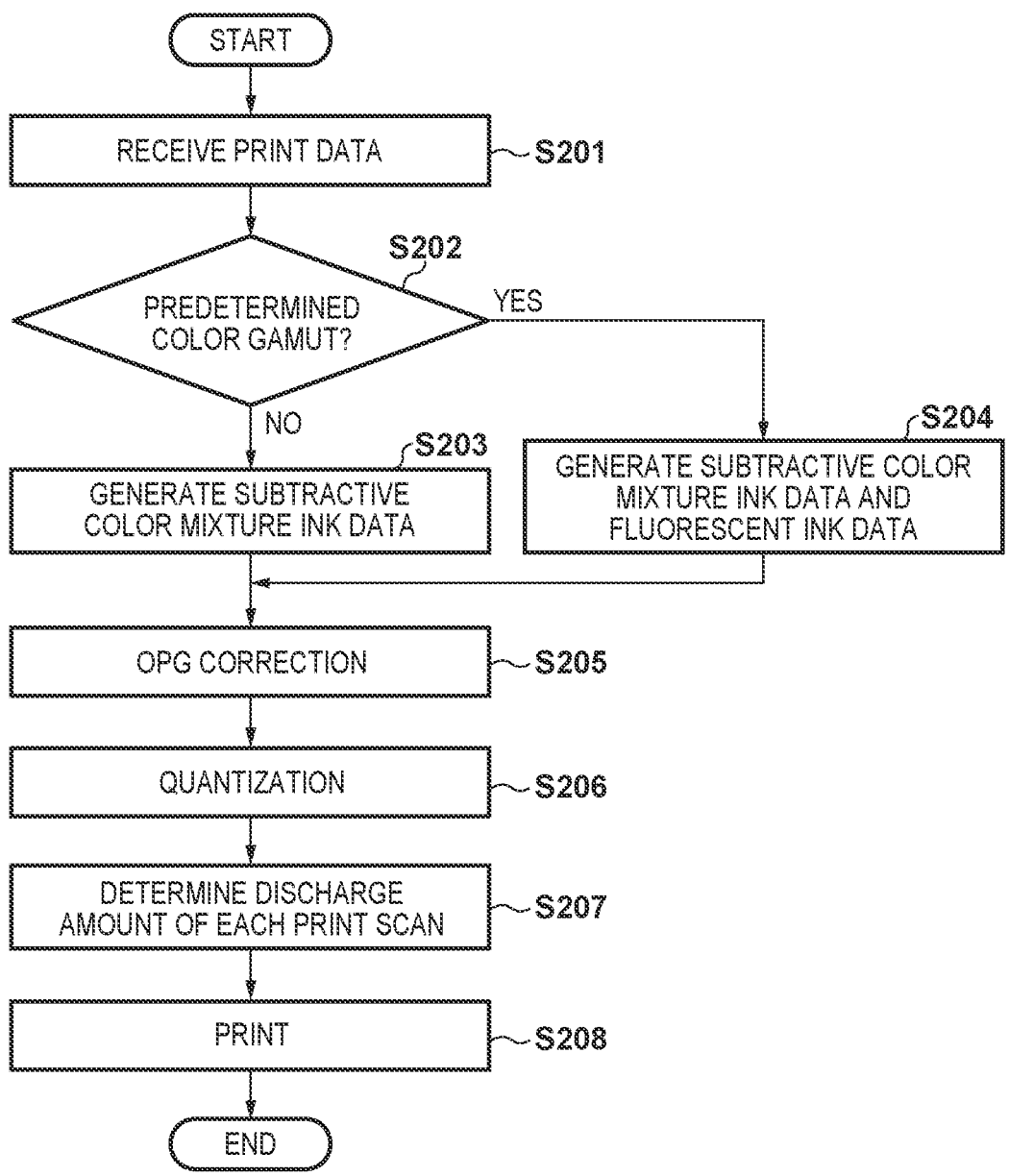
FIG. 12 is a flowchart for describing glossiness control processing.

FIG. 12 is a flowchart for describing glossiness control processing in the present embodiment. The process of FIG. 12 is realized, for example, by the CPU 111 reading a program stored in the ROM 113 to the RAM 112 and executing the program. The processing of FIG. 12 may be executed by the image processing accelerator 109.

In step S201, the CPU 111 receives the print data transmitted from the PC 101. Print data includes RGB data or CMYK data. In step S202, the CPU 111 determines whether or not the color gamut is a predetermined color gamut for each pixel from the received print data. If it is determined in step S202 that the color gamut is not the predetermined color gamut, in step S203, the CPU 111 generates subtractive color mixture ink data from the print data received in step S201. After step S205, the processing advances to step S105. Meanwhile, if it is determined in step S202 that the color gamut is the predetermined color gamut, in step S204, the CPU 111 generates subtractive color mixture ink data and fluorescent ink data from the print data received in step S201. Here, the fluorescent ink data that is generated corresponds to the fluorescent ink application amount reducing the glossiness, as in step S104 of FIG. 9. Step S202 to step S204 are repeated for each of the pixels described above.

Since step S205 to step S208 are the same as step S105 to step S108 of FIG. 9, their descriptions are omitted.

As described above, in the present embodiment, the ink data generation process is switched between step S203 and step S204. With such a configuration, the process of generating ink data based on colors corresponding to the same R, G, and B values or CMYK values can be performed independently of each other. In the case of the process of FIG. 9, the subtractive color mixture ink data generated in step S102 is the same in the case where it is determined that the color gamut is a predetermined color gamut in step S103 and the case where it is determined that the color gamut is not the predetermined color gamut. Meanwhile, in this embodiment, for both the case where it is determined in step S202 that it is the predetermined color gamut and the case where it is determined that it is not the predetermined color gamut, the subtractive color mixture ink data is generated after the determination processing. As a result, for example, the color tone represented by the result of step S203 and the color tone represented by the result of step S204 can be matched by making the ink application amount represented by the subtractive color mixture ink data generated in step S204 different from the ink application amount represented by the subtractive color mixture ink data generated in step S203.

Third Embodiment

Figure 13:
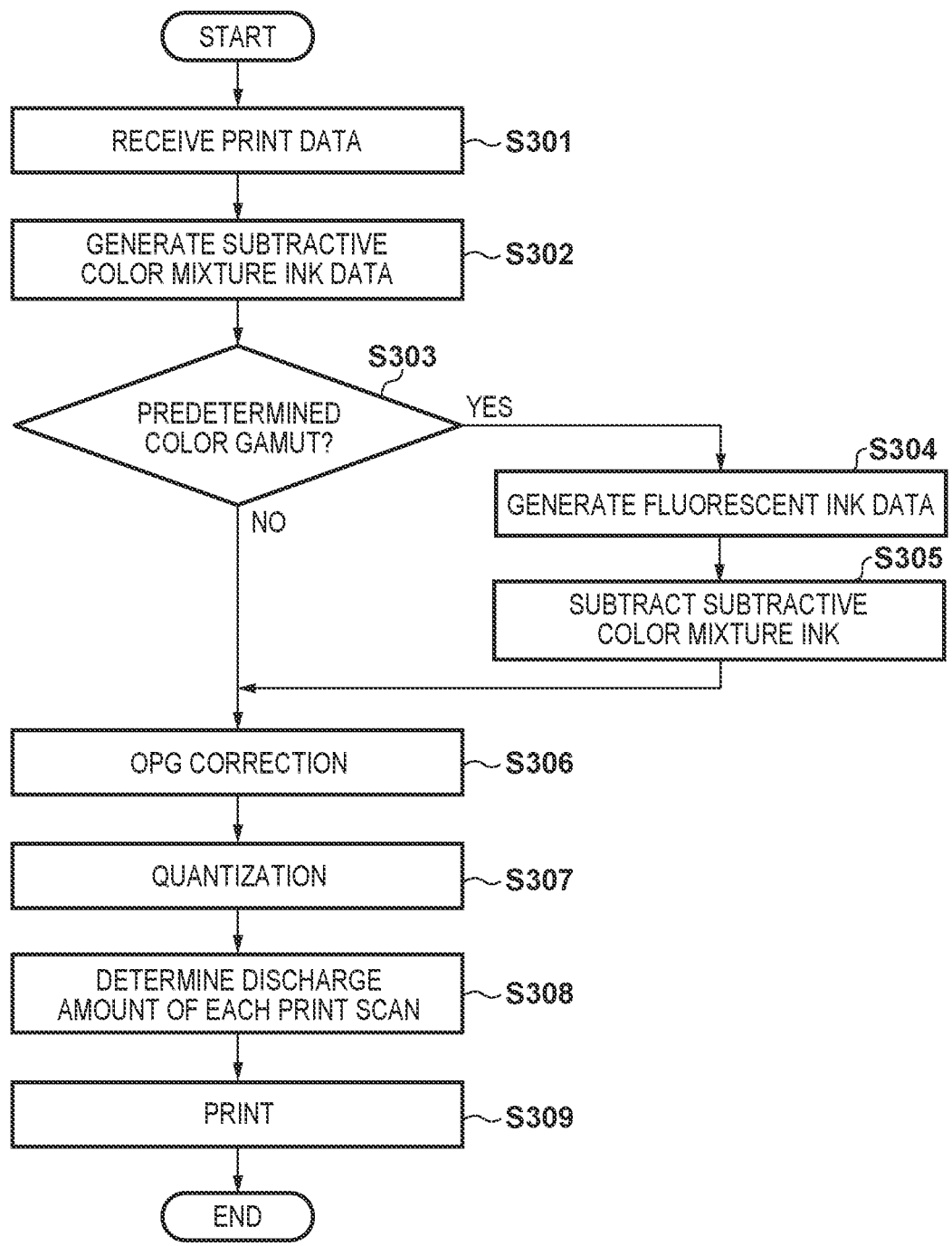
FIG. 13 is a flowchart for describing glossiness control processing.

Hereinafter, a third embodiment is described with reference to points that are different from the first and second embodiments. The present embodiment is the same as the first embodiment in that subtractive color mixture ink data is generated before the determination processing as to whether or not the color gamut is a predetermined color gamut. In this embodiment, when it is determined that it is the predetermined color gamut, after generating fluorescent ink data, control for subtracting the subtractive color mixture ink application amount is performed. FIG. 13 is a flowchart for describing glossiness control processing in the present embodiment. The process of FIG. 13 is realized, for example, by the CPU 111 reading a program stored in the ROM 113 to the RAM 112 and executing the program. The processing of FIG. 13 may be executed by the image processing accelerator 109.

In step S301, the CPU 111 receives the print data transmitted from the PC 101. Print data includes RGB data or CMYK data. In step S302, the CPU 111 generates subtractive color mixture ink data from the print data received in step S1101.

In step S303, the CPU 111 determines whether or not it is a predetermined color gamut for each pixel from the received print data. If it is determined in step S303 that it is not the predetermined color gamut, the processing advances to step S306. Meanwhile, if it is determined in step S303 that it is the predetermined color gamut, in step S304, the CPU 111 generates fluorescent ink data from the print data received in step S301. In step S305, the CPU 111 performs a process of subtracting the application amount of the subtractive color mixture ink based on the fluorescent ink data generated in step S304. Then, the processing advances to step S306. Step S302 to step S305 are repeated for each of the pixels. Since step S306 to step S309 are the same as was described for step S105 to step S108 of FIG. 9, their descriptions are omitted.

The process of subtracting the subtractive color mixture ink of step S305 will be described here. In step S304, a fluorescent ink is added to reduce glossiness. However, when the fluorescent ink is added, light is absorbed in the excitation wavelength range of the fluorescent ink, and the color of the subtractive color mixture ink changes. Therefore, in the present embodiment, the application amount of a subtractive color mixture ink which absorbs light in a wavelength range in which the excitation intensity of the excitation wavelength range of the fluorescent ink is high is reduced. By this, the influence of light absorption in the excitation wavelength range of the fluorescent ink can be reduced.

For the amount that subtractive color mixture ink is to be reduced, first, the intensity of light absorbed in the excitation is measured in advance for each fluorescent ink application amount. Further, the intensity of light absorption due to the subtractive color mixture ink to be reduced is measured in advance. The measurement method may, for example, measure spectral reflectance using a known method. From the measurement result, the application amount of the subtractive color mixture ink is calculated such that the spectral reflectance at the excitation wavelength of the fluorescent ink and the spectral reflectance of the subtractive color mixture ink at the same wavelength become the same. Then, in step S305, the subtractive color mixture ink application amount which was calculated as described above is subtracted based on the fluorescent ink application amount represented by the fluorescent ink data added in step S304.

As described above, in this embodiment, by subtracting the subtractive color mixture ink application amount from the amount of fluorescent ink added, it is possible to realize a decrease in glossiness due to an isotropic light emission effect of the fluorescent ink while suppressing a color change due to the addition of the fluorescent ink.

Fourth Embodiment

Figure 14:
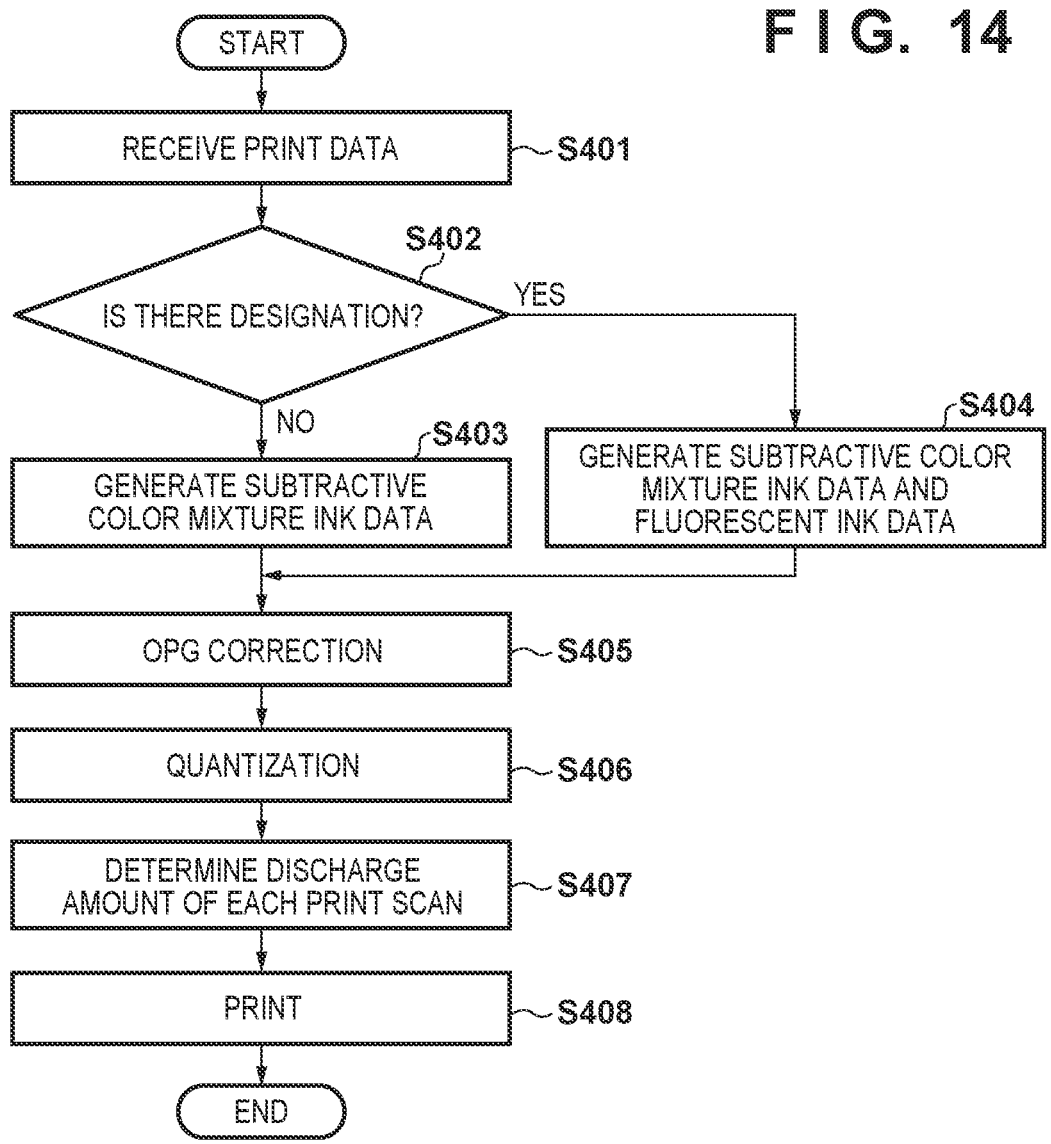
FIG. 14 is a flowchart for describing glossiness control processing.

Hereinafter, a fourth embodiment is described with reference to points that are different from the first to third embodiments. In the present embodiment, fluorescent ink data is generated based on glossiness control information input from the outside. FIG. 14 is a flowchart for describing glossiness control processing in the present embodiment. The process of FIG. 14 is realized, for example, by the CPU 111 reading a program stored in the ROM 113 to the RAM 112 and executing the program. The processing of FIG. 14 may be executed by the image processing accelerator 109.

In step S401, the CPU 111 receives the print data transmitted from the PC 101. Print data includes RGB data or CMYK data and glossiness control information. In step S402, the CPU 111 determines whether or not to generate the fluorescent ink data based on the glossiness control information received in step S401. Meanwhile, if it is determined in step S402 that the fluorescent ink data is not to be generated, in step S403, the CPU 111 generates the subtractive color mixture ink data from the print data received in step S401. After that, the processing advances to step S405. Meanwhile, if it is determined in step S402 that fluorescent ink data is to be generated, in step S404, the CPU 111 generates subtractive color mixture ink data and fluorescent ink data from the print data received in step S401. Here, the fluorescent ink data that is generated corresponds to a fluorescent ink application amount for reducing the glossiness, as in step S104 of FIG. 9. After that, the processing advances to step S405. Step S402 to step S404 are repeated for each of the pixels. Since step S405 to step S408 are the same as what was described for step S105 to step S108 of FIG. 9, their descriptions are omitted.

The glossiness control information in the present embodiment includes, for example, the above-described specular glossiness, diffuse reflection intensity obtained by measuring diffuse light, or the fluorescent ink application amount. The fluorescent ink application amount here represents an amount of the fluorescent ink to be applied to reduce the glossiness obtained by using specular glossiness or the like outside the printing apparatus 108.

Figure 15A:
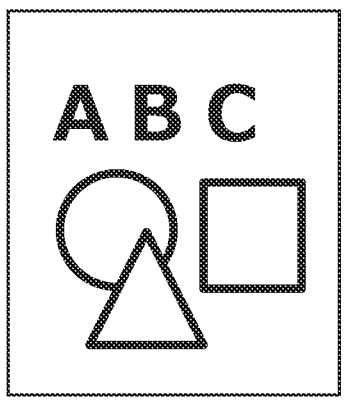
FIG. 15A to FIG. 15C are diagrams for explaining glossiness reduction information.
Figure 15B:
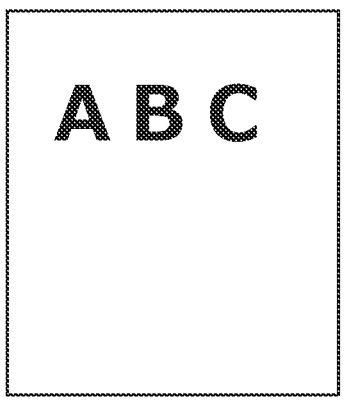

Here, glossiness control information received in step S401 is described with reference to FIG. 15. FIG. 15A is a diagram schematically illustrating RGB data or CMYK data. FIG. 15B schematically illustrates data in which glossiness control information is added to a text portion of FIG. 15A. The data of FIG. 15B is inputted as a plane differing from the RGB data or CMYK data of FIG. 15A, for example. In the glossiness control information, information indicating an area for lowering the glossiness and information indicating a degree to which the glossiness is to be lowered are set for each pixel.

Figure 15C:
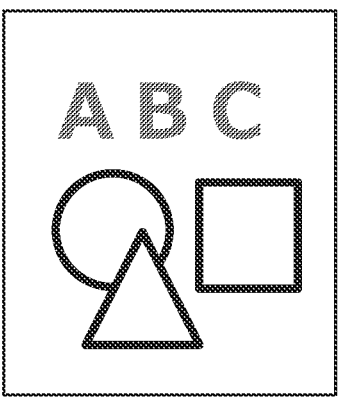

In the present embodiment, the pixel region for generating the fluorescent ink data and the application amount of the fluorescent ink to be generated are determined based on the glossiness control information. The degree to which the glossiness is to be lowered is determined based on the fluorescent ink application amount for reducing the glossiness described in the first embodiment. As a result, as illustrated in FIG. 15C, it is possible to obtain an image in which the glossiness is reduced only for the text portion. With such a configuration, the fluorescent ink data can be generated based on an area and a glossiness reduction degree designated by the user, and an image in which the glossiness of the desired area is reduced can be outputted.

In the above description, the printing apparatus 108 inputs the glossiness control information in a different plane, but the glossiness control information may be transmitted from the PC 101 as a print control command rather than a plane. In this case, the PC 101 transmits an RGB value or a CMYK value to be reduced in glossiness as a print control command. Then, in step S402, the CPU 111 performs control so as to generate the fluorescent ink data when it receives the RGB value or CMYK value transmitted in the print control command. With such a configuration, it is not necessary to transfer the data as a different plane, and the transfer time can be reduced.

As described above, in the present embodiment, the fluorescent ink data is generated based on an area and glossiness reduction degree designated by the user. As a result, it is possible to output an image in which glossiness is lowered as intended by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-019237, filed Feb. 9, 2021, which is hereby incorporated by reference herein in its entirety.

What is claimed is:

1. A printing apparatus comprising:
   a printing unit configured to print an image by having a nozzle array set in a conveyance direction of a printing medium and reciprocating in a scanning direction that intersects the conveyance direction of the printing medium to apply ink droplets onto the printing medium from nozzles,
   wherein the printing unit has a nozzle array corresponding to a fluorescent ink and a nozzle array corresponding to another ink different to the fluorescent ink;
   a print control unit configured to control a movement of the printing unit and conveyance of the printing medium so as to print an image by a plurality of scans of the printing unit; and
   a decision unit configured to decide ink application amount ratios of the fluorescent ink and the other ink respectively in each of the plurality of scans, wherein
   the print control unit, based on the ink application amount ratios decided by the decision unit, performs control of the movement of the printing unit and the conveyance of the printing medium, and
   the decision unit decides the ink application amount ratio of the fluorescent ink in each of the plurality of scans so that the amount of the coloring material of the fluorescent ink in a surface of an ink layer of the printing medium is less than the amount of the coloring material of the fluorescent ink in an inside of the ink layer.

2. The printing apparatus according to claim 1, wherein the decision unit decides the ink application amount ratios of the fluorescent ink and the other ink respectively so that in the surface of the ink layer the amount of the coloring material of the fluorescent ink is less than the amount of the coloring material of the other ink.

3. The printing apparatus according to claim 1, wherein the decision unit decides the ink application amount ratio of the fluorescent ink in each of the plurality of scans so that a first amount of the coloring material of the fluorescent ink in a surface of the ink layer increases gradually up to a second amount of the coloring material of the fluorescent ink in the inside of the ink layer.

4. The printing apparatus according to claim 3, wherein the decision unit decides the ink application amount ratio of the fluorescent ink in each of the plurality of scans so that the second amount of the coloring material of the fluorescent ink in the inside of the ink layer decreases gradually down to a third amount of the coloring material of the fluorescent ink in a lowermost layer.

5. The printing apparatus according to claim 1, wherein the decision unit decides the ink application amount ratio of the other ink in each of the plurality of scans so that the amount of the coloring material of the other ink is constant across the plurality of scans.

6. The printing apparatus according to claim 1, wherein printing by the fluorescent ink is performed at full nozzle.

7. The printing apparatus according to claim 1, wherein the decision unit decides the ink application amount ratio of the fluorescent ink in each of the plurality of scans so that a first amount of the coloring material of the fluorescent ink in the surface of the ink layer switches to a second amount of the coloring material of the fluorescent ink in the inside of the ink layer.

8. The printing apparatus according to claim 7, wherein the printing of the fluorescent ink is performed using a part of a nozzle array corresponding to the fluorescent ink.

9. The printing apparatus according to claim 1, further comprising:
   a first generation unit configured to generate ink data of the fluorescent ink; and
   a second generation unit configured to generate ink data of the other ink, wherein
   the print control unit performs the control of the movement of the printing unit and the conveyance of the printing medium based on at least one of ink data of the fluorescent ink generated by the first generation unit and ink data of the other ink generated by the second generation unit.

10. The printing apparatus according to claim 9, wherein in a case where ink data of the fluorescent ink is generated by the first generation unit, the decision by the decision unit is performed.

11. The printing apparatus according to claim 9, wherein the generation by the first generation unit is performed for a pixel corresponding to a predetermined color gamut in a color space that the image expresses.

12. The printing apparatus according to claim 11, wherein the predetermined color gamut is determined based on an emission wavelength of the fluorescent ink.

13. The printing apparatus according to claim 11, wherein the predetermined color gamut is such that a color of the fluorescent ink and a complementary color are not in a relationship.

14. The printing apparatus according to claim 11, further comprising a determination unit configured to determine whether or not the pixel corresponds to the predetermined color gamut.

15. The printing apparatus according to claim 14, wherein the generation by the second generation unit is executed before the determination by the determination unit.

16. The printing apparatus according to claim 14, wherein the generation by the second generation unit is executed after the determination by the determination unit.

17. The printing apparatus according to claim 14, wherein the generation by the first generation unit is executed after the determination by the determination unit.

18. The printing apparatus according to claim 17, wherein, in a case where the generation by the first generation unit and the generation by the second generation unit are executed after the determination by the determination unit, the second generation unit, based on ink data of the fluorescent ink generated by the first generation unit, generates ink data of the other ink.

19. The printing apparatus according to claim 18, wherein the second generation unit reduces an application amount of the other ink in accordance with an application amount of the fluorescent ink.

20. The printing apparatus according to claim 1, further comprising an obtainment unit configured to obtain control information for controlling glossiness, wherein a decision by the decision unit is performed in a case where the control information is obtained by the obtainment unit.

21. The printing apparatus according to claim 20, wherein the control information includes at least one of information indicating an area in which glossiness is to be lowered and information indicating a degree to which glossiness is to be lowered.

22. A printing method, comprising:
printing an image by having a nozzle array set in a conveyance direction of a printing medium and reciprocating in a scanning direction that intersects the conveyance direction of the printing medium to apply ink droplets onto the printing medium from nozzles;
in order to print an image by a plurality of scans of a printing unit that has a nozzle array corresponding to a fluorescent ink and a nozzle array corresponding to another ink different to the fluorescent ink, controlling a movement of the printing unit and conveyance of the printing medium; and
deciding ink application amount ratios of the fluorescent ink and the other ink respectively in each of the plurality of scans, wherein
performing the control of the movement of the printing unit and the conveyance of the printing medium based on the decided ink application amount ratios,
deciding the ink application amount ratio of the fluorescent ink in each of the plurality of scans so that the amount of the coloring material of the fluorescent ink in a surface of an ink layer of the printing medium is less than the amount of the coloring material of the fluorescent ink in an inside of the ink layer.

* * * * *